2,816,396
Patented Dec. 17, 1957

2,816,396

PROCESS FOR USE OF PYRITES CINDER IN SOIL TREATMENT

Edgar D. Ross, San Francisco, and Oswald E. Griffin, Berkeley, Calif., assignors to Metco Iron Oxide Corp., San Francisco, Calif., a corporation of California No Drawing. Application December 7, 1953, Serial No. 396,736

9 Claims. (Cl. 47—58)

This invention relates to a new and useful process for the use of pyrites cinder in the treatment of soil. The invention relates to the use in the treatment of soil of relatively high alkalinity of soluble iron salts existing in a fused state with ferric oxide and other metals and more particularly with the residue, clinker or cinder resulting from the roasting of pyrites in the production of sulphur, sulphuric acid, and other products.

The present invention relates to the use of pyrites cinder in the reduction of the alkalinity of soil. The cinder contains ferric sulphate and ferric bisulphate which interact with the alkaline carbonates in certain soils and produce a beneficial effect in that the alkaline components are neutralized.

A feature of the invention is the fact that the iron sulphate or bisulphate interacts with the carbonates in the soil to produce ferric carbonate. The ferric carbonate upon contact with water emits carbon dioxide gas which is given off as small bubbles and creates a porosity in the soil and assists in breaking up lumps and otherwise is desirable soil treatment.

One important advantage of the invention is the fact that in the use of the material carbonic acid is produced which acid is effective in reducing alkalinity and further, in changing soil-binding sodium clay to hydrogen clay and further effective in releasing fertilizing and mineral elements from clay colloids of the soil through exchange absorption.

A further advantage of the present invention is the ion exchange which takes place in improving the soil texture of the soil-binding sodium clay and the release of fertilizing and mineral elements which are otherwise fixed in the clay colloids of the soil. An example of this effect is the increase of available potash. A large portion of the total potash is tied up in insoluble organic compounds. When the alkalinity of the soil is reduced, the solubility of the potash compound is increased thereby increasing the available total potash. The complex potash salts are reacted on by the iron of the cinder which releases the soluble potash, thereby carrying out a base exchange. In addition to potash, nitrogen, phosphorous and calcium are similarly made more readily available.

In the use of the present invention the sodium ions existing in poor soil are replaced by hydrogen ions, thereby greatly improving the agricultural characteristics of the clay, water penetration, ease of root expansion and release of fertilizing elements in soluble state.

Another advantage of the invention is the fact that the iron in the cinder is of benefit to soils which are low in iron.

Still another advantage of the invention is the fact that the reduction of the alkalinity of the soil promotes the production of enzyme systems which are beneficial in the natural digestion of organic matter in the soil.

Still another advantage of the lowering of the alkalinity of the soil is a change in the ion exchange resulting in better flocculation of soil particles, especially when there is enough organic matter present in the soil to provide organic colloids as well as the mineral colloids for this floccing action. In the treatment of soils containing heavy clays and adobe, a change in the ionic exchange in the soil is very desirable in that it enables the plant food material present in the soil to be made available to the growing plants by reason of the fact that air and water can surround the individual groups of flocs of the soil colloids.

Enzyme systems require for their existence a continual supply of small amounts of the so-called "trace elements," preferably in oxide form. Heretofore the supply of "trace elements" has been in the form of sulphates which tend to fix or combine with the base elements of the soil and become unavailable to growing plants. Iron is one of the important elements in the growth of enzyme systems and it is most desirable that such iron be available in oxide form as distinguished from other forms. The present invention therefore, employing pyrites cinder supplies both iron and trace elements in oxide form which is most desirable in the growth of enzyme systems promoting plant growth.

The isoelectric point of the trace elements is also important when they are in oxide form, as they function with other minerals and the enzymes in the soil to produce a flocculation of the soil particles which produces a better soil condition for plant growth, bacterial action and the forming of plant food combinations of essential minerals.

The cinder which is the subject of this invention has considerable advantage over ferric sulphate and ferric bisulphate in other forms. The addition of pure ferric sulphate or ferric bisulphate to soil is not desirable in that it tends to burn the soil and the spreading of the material over an area of a field may result in patches where a high concentration may produce very undesirable effects. Furthermore, the interaction of the ferric sulphate and bisulphate with the alkaline carbonates in the soil is quite rapid and the beneficial effect is therefore temporary. The present invention, on the other hand, by reducing the amount of ferric sulphate in each given weight of the material over that of ferric sulphate not so fused insures that undesirable effects from uneven spreading of the material will not result. In addition, and more importantly, the action is slowed down and its effect is of much greater duration so that, whereas if pure ferric sulphate were added to the soil, its effect would be dissipated in a very short time, the use of the present invention spreads out the desirable effects over several crops or several growing seasons.

Another advantage of the invention is that, when used on the soil in the proportions hereinafter set forth, the green color of foliage and the optimum color of fruits and flowers are markedly increased over colors obtained without such treatment or with treatment with other soil conditioners and fertilizers. Accordingly, the present invention has particular advantage where chlorosis conditions prevail.

The foregoing objects and advantages of the invention will become more apparent upon consideration of the following detailed description of the invention.

Roasting of iron pyrites

Roasting of iron pyrites in the production of sulphur is a common industrial process. A by-product, which heretofore has frequently been a waste product, is termed "pyrites cinder." The exact chemical composition of such cinder is dependent to a considerable extent upon the composition of the ore being roasted and is also dependent upon the thoroughness of the roasting process. The chemical composition of a typical pyrite cinder useful in the present invention is as follows:

| | Percent |
|---|---|
| $Fe_2(SO_4)_3$ | 1.60 |
| $Fe(HSO_4)_3$ | 5.44 |
| $Fe_2O_3$ | 85.10 |
| $SiO_2$ | 3.40 |
| $Al_2O_3$ | 4.16 |
| Trace | Balance |

Trace elements present in a typical pyrites cinder in the range between 0.30 to 3% include zinc; between 0.03 to 0.30% include calcium, copper and magnesium; less than 0.03% include boron, chromium, cobalt, lead, manganese, nickel, potassium, silver, sodium, tin, titanium and vanadium. The foregoing is subject to variation depending upon the ore being roasted. It will be noted, however, that many of the trace elements are desirable additions to soils which may be low in such ingredients. The trace elements are present in the cinder mostly in the form of oxides.

From the standpoint of physical properties, pyrite cinder is a purplish-brown dense, granular material. As commonly produced in the roasting process, approximately 80% passes a four-mesh screen, although finer particles may be produced and employed after grinding.

An important physical property of the pyrite cinder which is particularly beneficial in connection with the present invention is the fact that the soluble iron salts are fused upon the ferric oxide. After the cinder has been spread and mixed with the coil, as hereinafter appears, its physical nature—i. e., the fusing of the soluble salts and ferric oxide together—slows up the interaction with the alkaline components of the soil and thus instead of the soluble iron salts being neutralized in a very short time, the process continues over a long period of time. The fused state of the product is thought to retard the dissolving of the soluble iron salts in the soil.

Use of cinder in soil treatment

In using the material, a regular spreader or standard fertilizer broadcasting equipment may be employed. From 1000 to 10,000 pounds of the material per acre or an average of 4000 pounds per acre may be spread. It is desirable, although not necessary, to work the material into the top few inches of the soil before the soil is irrigated or comes in contact with rain.

Effect of process

Alkaline soils vary in their exact chemical composition, but for present purposes the alkalinity will be expressed as sodium carbonate, it being understood that carbonates, bicarbonates and hydroxides of various alkaline metals may be present. The ferric sulphate in the pyrite cinder interacts with the sodium carbonate as expressed in the following equation:

$$Fe_2(SO_4)_3 + 3Na_2CO_3 \rightarrow Fe_2(CO_3)_3 + 3Na_2SO_4$$

The ferric carbonate upon contact with water produces the following reaction:

$$Fe_2(CO_3)_3 + 6H_2O \rightarrow 2Fe(OH)_3 + 3H_2CO_3$$

The carbonic acid then decomposes to produce carbon dioxide and water:

$$H_2CO_3 \rightarrow H_2O + CO_2$$

The ferric bisulphate in the pyrite cinder interacts with the sodium carbonate in the following equation:

$$2Fe(HSO_4)_3 + 6Na_2CO_3 \rightarrow Fe_2(CO_3)_3 + Na_2SO_4 + 3H_2O + 3CO_2$$

The ferric carbonate then further reacts as above indicated.

From consideration of the foregoing two systems of equations it will be seen that the alkaline components of the soil are neutralized into sodium sulphate, or equivalent, thereby lowering the pH of the soil. Another feature of the foregoing reactions is the emission of carbon dioxide which rises through the soil and makes the same more porous.

Reduction of the alkalinity of the soil has other beneficial effects in that the growth of enzyme systems in alkaline soil is retarded whereas by reducing the alkalinity in accordance with the present invention, the growth of enzyme systems is promoted. In addition flocculation of the soil is enhanced, as heretofore set forth.

The growth of enzyme systems is promoted by the presence of iron and trace elements, preferably in the oxide form. Pyrite cinders contains such oxides of iron and trace elements and thus is most beneficial from the standpoint of the enzyme systems promoting plant growth. Pure iron sulphates tie up too quickly in the soil to allow optimum conditions for developments of enzyme systems.

One of the important features of the invention is the fact that the physical properties of the pyrite cinder slow down the carrying out of the chemical reactions heretofore set forth by reason of the fact that the fusing of the soluble iron salts with the insoluble ferric oxide delays dissolution. Thus the beneficial effects, and particularly the emission of carbon dioxide, take place over a prolonged period of time rather than being of merely a temporary duration.

Soils treated in accordance with the present invention are improved and tend to produce a greater yield per acre than is possible under natural conditions or with other treatments.

Although we have described our invention in some detail by way of illustration and example for purposes of clarity of understanding, it is understood that certain changes and modifications may be practiced within the spirit of the invention and scope of the appended claims.

What is claimed is:

1. The process of using iron pyrite cinders to treat alkaline soil which comprises contacting the soil with pyrite cinder wherein soluble iron salts are fused upon iron oxide in the range of 1000 to 10,000 lbs. per acre.

2. The process of using iron pyrite cinder to reduce the alkalinity of soil which comprises adding the cinder wherein soluble iron salts are fused upon iron oxide to the top of the soil.

3. The process of using iron pyrite cinder to reduce alkalinity of soil and increasing porosity which comprises adding the cinder wherein soluble iron salts are fused upon iron oxide to the top of the ground.

4. The process of using iron pyrite cinder to reduce alkalinity of soil, increase porosity, and promote the growth of enzyme systems in the soil which comprises adding the cinder wherein soluble iron salts are fused upon iron oxide to the top of the soil.

5. The process of using a product comprising metallic sulphate fused upon ferric oxide to treat soil, which comprises spreading said product upon the soil surface.

6. The process of using a product comprising metallic sulphates fused upon metallic oxides to reduce alkalinity of soil, which process comprises spreading said product upon the soil.

7. The process of claim 6 in which said product is spread in the range of 1000 to 10,000 lbs. per acre.

8. The process of claim 6 in which said product is spread at the average rate of approximately 4000 lbs. per acre.

9. The process of using a product comprising metallic sulphates fused upon metallic oxides, to reduce alkalinity, increase porosity and promote the growth of enzyme systems beneficial to crop yield, which process comprises spreading said product upon the soil.

(References on following page)

References Cited in the file of this patent

UNITED STATES PATENTS

| | | |
|---|---|---|
| 238,240 | Lippincott | Mar. 1, 1881 |
| 1,045,723 | McFetridge | Nov. 26, 1912 |
| 1,353,931 | Miller | Sept. 28, 1920 |
| 1,518,571 | Cowles | Dec. 9, 1924 |
| 1,614,305 | Johnson | Jan. 11, 1927 |
| 2,103,953 | Northen | Dec. 28, 1937 |
| 2,129,334 | Northen | Sept. 6, 1938 |
| 2,532,548 | Heide | Dec. 5, 1950 |
| 2,741,876 | Paoloni | Apr. 17, 1956 |

FOREIGN PATENTS

| | | |
|---|---|---|
| 640,652 | Germany | Jan. 9, 1937 |
| 455,121 | Italy | Feb. 14, 1950 |
| 456,362 | Italy | Apr. 1, 1950 |

OTHER REFERENCES

Gasparini et al.: "Nuovi Studi e Realizzazioni Sulla Correzione dei Terreni Argillosi," published 1949 at Florence, Italy, in vol. 125 (or vol. 13 of Series 6), pp. 113–130 of I Georgofili Atta della Accademia dei Georgofili, for January-June 1949. Copy in Division 1 at 47–58—Soil Treatment.

Chemical Abstracts, vol. 32, published 1938, column 5142, article "The Use of Pyrite Slag as Copper Fertilizer."

Chemical Abstracts, vol. 46, columns 7805 and 7806, published August 25, 1952, article "The Cultivation of Kok-saghyz."